US00RE39091E

(19) United States
(12) Reissued Patent
Kuelker

(10) Patent Number: US RE39,091 E
(45) Date of Reissued Patent: May 9, 2006

(54) CONCRETE PANEL CONSTRUCTION

(75) Inventor: Peter A. Kuelker, Calgary (CA)

(73) Assignee: Stonetile (Canada) Ltd., Calgary (CA)

(21) Appl. No.: 10/166,190

(22) Filed: Jun. 11, 2002

Related U.S. Patent Documents

Reissue of:
(64) Patent No.: 6,253,515
Issued: Jul. 3, 2001
Appl. No.: 09/519,331
Filed: Mar. 7, 2000

U.S. Applications:
(63) Continuation-in-part of application No. 08/603,243, filed on Feb. 20, 1996, now abandoned.

(30) Foreign Application Priority Data

Feb. 2, 1996 (CA) ..... 2169585

(51) Int. Cl.
*E04B 2/28* (2006.01)

(52) U.S. Cl. ..... 52/506.05; 52/384; 52/385; 52/508; 52/511

(58) Field of Classification Search ..... 52/506.05, 52/511, 508, 384, 385, 600
See application file for complete search history.

(56) References Cited

U.S. PATENT DOCUMENTS 4,553,366 A * 11/1985 Guerin ..... 52/506.08
5,375,385 A * 12/1994 Feder ..... 52/385
5,398,473 A * 3/1995 Chan ..... 52/506.06

* cited by examiner

*Primary Examiner*—Carl D. Friedman
*Assistant Examiner*—Brian E. Glessner
(74) *Attorney, Agent, or Firm*—Miller Thomson LLP

(57) ABSTRACT

A concrete panel system comprising a plurality of concrete panels arranged in side-by-side fashion on a substantially vertical supporting wall, each of the panels comprising a rectangular body having a front surface and a rear surface and beveled side edges, the side edges each forming an angle of between eighty-five and ninety degrees with the rear surface, and a concave caulking groove lying between and connecting each of the beveled side edges with the front face, the side edges of adjacent panels forming a V-joint between the adjacent panels, a flexible sealant material in a portion of the caulking grooves of adjacent panels and a portion of the V-joint for providing a seal between adjacent panels, and a hanger element embedded in the rear of the panels for securing the panels to the supporting wall.

16 Claims, 12 Drawing Sheets

CONCRETE PANEL CONSTRUCTION

Matter enclosed in heavy brackets [ ] appears in the original patent but forms no part of this reissue specification; matter printed in italics indicates the additions made by reissue.

This application is a continuation-in-part of U.S. application Ser. No. 08/603,243, filed Feb. 20, 1996 now abandoned.

This invention relates to an improved building panel, as well as a method and apparatus for producing the building panels, and in particular to concrete building panels for exterior use on buildings. This new cladding system is a radical departure from any commonly used systems.

FIELD OF THE INVENTION

Thin panels of the type produced in accordance with the present invention are used to simulate natural stones. Because the panels are relatively thin, the cost of producing a simulated stone finish is substantially less expensive than when using artificial or real stones. Panels of the type described herein are typically produced in separate molds which is both time consuming and expensive.

BACKGROUND OF THE INVENTION

Cladding systems such as stucco, brick, stone and artificial stone veneer are typically manufactured off-site and installed on a building using mortars which are prepared on the building site. Such systems often encounter a great number of potential problems related to the particular systems. For example, the quality of the mortar materials is often impaired due to the fact that monitoring of accurate formulas on the building site is difficult. Moreover, variations in weather and temperature can affect the mortars significantly.

The installation of typical masonry products is often hindered by weather conditions, such as rain and freezing conditions which usually force a work stoppage unless measures are taken to shield the work area.

The quality of these materials is further impaired due to the fact that typically these mortar materials are allowed to air dry without attempting to seal these cementitious products for proper curing. Sealing during curing greatly improves cementitious products thus making them denser and reducing a condition known as efflorescing, a process that allows calcium to migrate from the material and deposit on the surface. Efflorescence is extremely difficult to prevent in presently known masonry cladding installation systems.

Typically with presently known masonry cladding systems it is necessary to provide mixing equipment on job sites for preparing the cementitious mortar products that are required for installation.

In the case of stucco it becomes necessary to carry out the installation in three or four steps such as: wire installation, first layer of stucco (scratch coat) second layer (float coat) and top layer (finish coat). Often with stucco or artificial stone, an inferior cladding system is achieved due to the fact that no venting space is provided in behind the cladding.

Brick and stone cladding systems are generally very heavy, and special consideration must be given, especially in the areas of the foundation and over window and door openings, to supporting this weight.

Generally speaking all existing masonry cladding systems are plagued with cracking problems. It is virtually impossible to prevent this condition. Furthermore, all existing masonry cladding systems require unsightly expansion joints, both laterally and vertically. Concealing these joints is virtually impossible.

It is also difficult to maintain a uniform minimum thickness with presently known masonry cladding systems.

Presently known artificial stone cladding systems require surface preparation such as a stucco base coat. This adds greatly to their expense.

Finally, known masonry cladding systems are prone to dirt entrapment.

As is evident from the above discussion of the prior art, what is needed is a cladding system where these above mentioned conditions are eliminated or at least minimized.

OBJECTS OF THE INVENTION

The object of the present invention is to solve the above mentioned problems by providing a relatively simple, efficient method and apparatus for producing concrete panels.

An object of the present invention is to provide a panel with a peripheral shoulder that, with an adjoining panel, forms[,] a channel that is most conducive for receiving caulking.

Another object of the invention is that a V-groove between panels is formed that offers a maximum surface for caulking adhesion.

Another object of the invention is to eliminate the need for unsightly expansion joints.

Another object of this invention is to provide concrete panels having beveled side edges which provide a limited crush zone that absorbs thermal expansion without damage to the panel itself.

Another feature of this invention is that each panel has a molded center mark. This feature greatly assists in centering the panels during installation. This mark is located in the side shoulder and becomes covered by the flexible grout.

Another object of this invention is to provide a masonry product which can be installed without mortars, glues, nails, or additional brackets.

Another feature of the invention is that each panel has two cast-in-place hangers that provide several advantages.

A feature of the hanger allows the panel to be simply screwed to a wall.

Another feature of the hanger is that it provides a vent or draining space behind the panel preventing any water from ever contacting the building itself.

Another feature of the hanger is that a kink in the end of the nails prevent pull out and that the point of the nails prevent surface spotting that are normally caused by minor temperature differences of metal and curing concrete.

Another feature of this invention is that the plural leg sets of the hangers have spring action and are shaped in such a way that concrete break out during installation is avoided, and that proper panel tension is provided and that adequate strength against cyclonic conditions exists.

It is another feature of the hangers that four syphoning bridges are provided on each hanger. These bridges help to prevent [of] concrete from traveling into the hanger positioning cavities.

Another feature of the hanger is that the center section can be cut away and when horizontally screwed to the wall it can be used as a stabilizing bracket for a single hangered smaller panel.

Another object of the invention is that an unusually thin but relatively rigid thermoformed plastic form is used to greatly reduce mold costs.

Another feature of the form is that hanger positioning cavities are built in allowing the hangers to remain accurately positioned during vibration.

It is a feature of this invention that the forms feature releasing strips, back-up panels, stacking strips and a thin membrane that prevents thermal cracking. These thin fragile forms can be stacked in an unusually small space and support in excess of one ton of loading capacity.

It is a feature of this invention that a multi-layered form stack can be demolded or removed from the mold simultaneously by lifting and pivoting the complete stack 180 degrees. The mold releasing strips gently push on the edges of the form thus releasing all the panels and allowing them to rest on the bottom of the back-up panel, ready for bundling and shipping.

Another object of the invention is to provide a masonry product that can be installed during freezing temperatures without the need for [hording] *hoarding*, which is the practice of building a temporary enclosure of canvas, plastic, etc. around the work area to keep out weather, and to enable heating of the work area within the enclosure.

Another object of this invention is to provide panels which are compact and can be installed with great speed.

Another object of the invention is to provide an improved "mortar" which is crack resistant. This is achieved through the use of urethane caulking that is then coated with silica sand, giving the caulking an aesthetically pleasing mortar appearance. This silica sand coating now greatly improves the resistance to ultraviolet radiation damage of the urethane caulking. An additional coating of dolomite dust avoids the caulking becoming soiled from airborne dust particles.

Another feature of the invention is the bottom and top "J" channels have perforations to allow the vent space to function and also retain the bottom of the bottom panel and the top of the top panel.

Another feature of the invention is a dispensing apparatus with lateral rollers and tracks and an adjustable chamber equal in volume to a panel.

Another object of the invention is to provide a molding method which utilizes lateral shock vibration, jarring air bubbles free instantly and allowing them to travel away from what will be the panel face virtually eliminating all surface air voids.

Another object of the invention is to provide a tilting stretch wrap bundler which greatly reduces shipping breakage.

Another object of this invention is to provide concrete panels which can be complimented with a comprehensive line of concrete architectural component that are produced with the same method as described above resulting in a dramatic new look that simulates European architecture at a great cost saving.

It is another feature of this invention to easily obtain a number of different surface profiles that will offer an unlimited choice of design alternatives.

It is another object of the invention to provide panels which have a glossy concrete surface that is resistant to any surface dirt entrapment. The glossy surface is achieved by high gloss plastic molds.

It is another object of the invention to obtain better quality control by providing panels which are prefabricated under controlled conditions dissimilar to other masonry cladding systems like stucco, artificial stone, brick and real stone.

BRIEF SUMMARY OF THE INVENTION

Accordingly, the invention relates to a method of producing a concrete building panel of the type including a thin concrete body and metal hangers embedded in the body for mounting the panel, said method comprising the steps of:

(a) placing hangers for the panel on a form;

(b) loading a transfer dispenser with sufficient concrete to fill the form;

(c) placing the transfer dispenser over the form, to release the concrete into the form; and (d) applying shock vibration to the form to release air bubbles and settle the concrete in the form.

The invention also relates to an apparatus for producing a concrete building panel of the type including a thin, concrete body and metal hangers embedded in the body for mounting the panel, said apparatus comprising:

(a) thin plastic form means defining a cavity including bottom wall means, side wall means and an open top for receiving concrete;

(b) hanger positioning cavity means on said side wall means for supporting said metal hangers in the open top of the form;

(c) transfer dispenser means for receiving and dispensing a predetermined volume of concrete into said form means; and (d) vibrator means for applying shock vibration to said form to eliminate air pockets in the concrete.

The invention also relates to an improved concrete building panel which comprises a thin concrete body having metal hangers embedded in the rear of the body for mounting the panel, and a decorative front face. The front face may be textured, smooth, colored or otherwise finished to provide a decorative appearance according to the design tastes of the designer or owner.

The front and the rear faces of the body are substantially parallel, and the sides of the panel comprise a beveled edge which adjoins the rear face at an angle slightly less than ninety degrees, and extends toward the front face. A caulking ledge or groove extends around the periphery of the panel and joins the beveled edge and the front face. The caulking ledge or groove is a concave recessed groove which will receive a caulking material for sealing the space between adjacent panels.

The adjacent panels will be in contact with each other at the back edge of the panels, but because of the slight bevel, the adjacent panels do not contact each other at the front face. In this manner, any expansion of the panels will cause compression cracking or crushing of the panel only at the rear of the panel, and only in a localized area. The caulking material, such as a urethane caulk, will seal the space between the panels and prevent intrusion of moisture.

As noted above, a silica sand may then be applied over the caulking if desired, to alter the aesthetic appearance of the structure.

BRIEF DESCRIPTION OF THE DRAWINGS

The invention will be described, by way of example only, reference being had to the accompanying drawings in which.

DESCRIPTION OF THE PREFERRED EMBODIMENT

Figure 2:
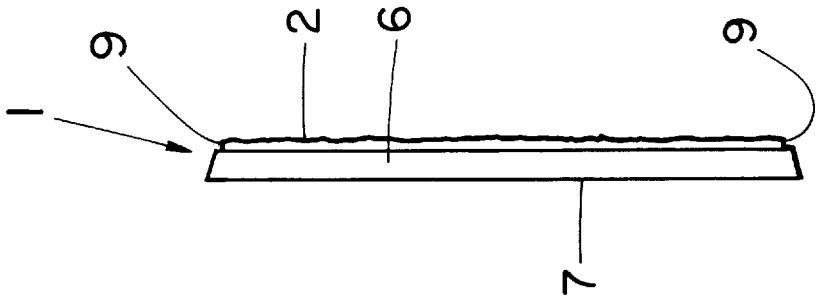
FIG. 2 is a side view of the panel of FIG. 1.
Figure 1:
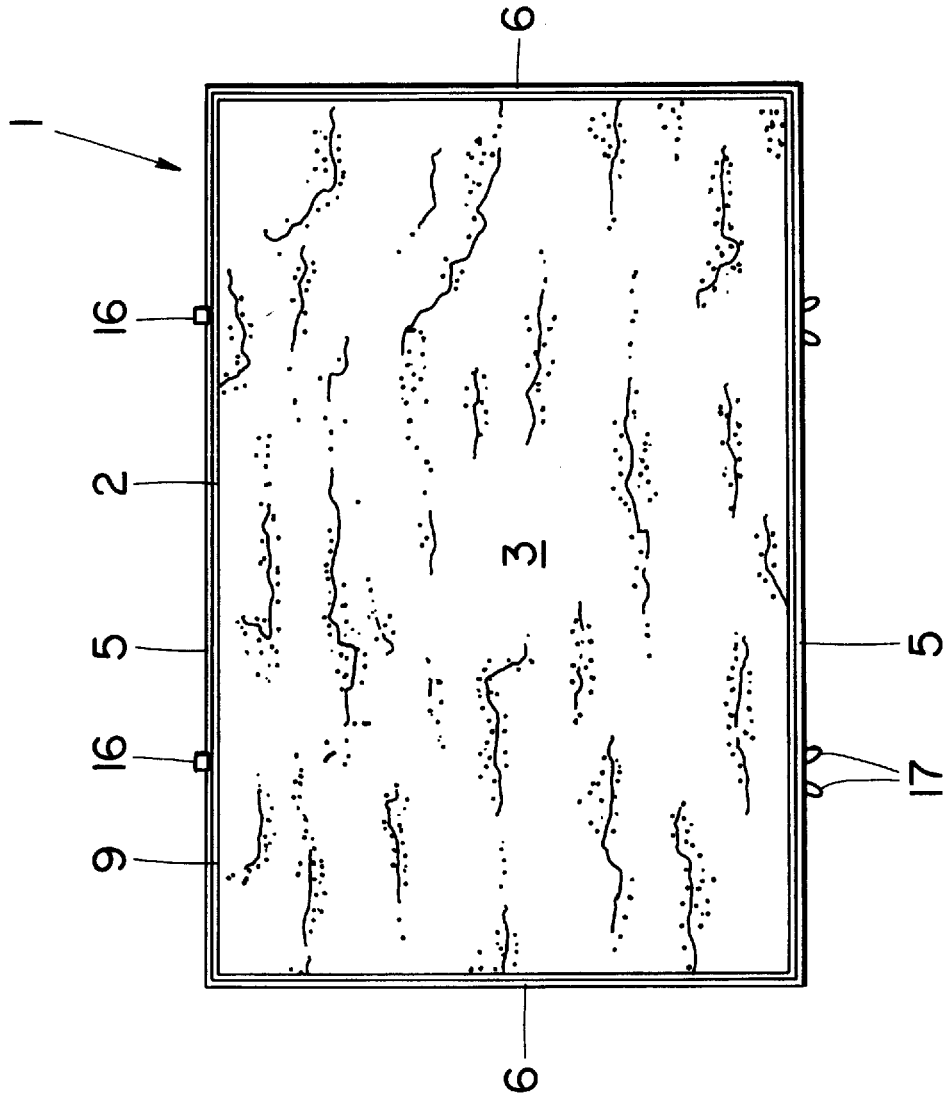
FIG. 1 is a front view of a textured concrete panel produced using the method and apparatus of the invention.
Figure 4:
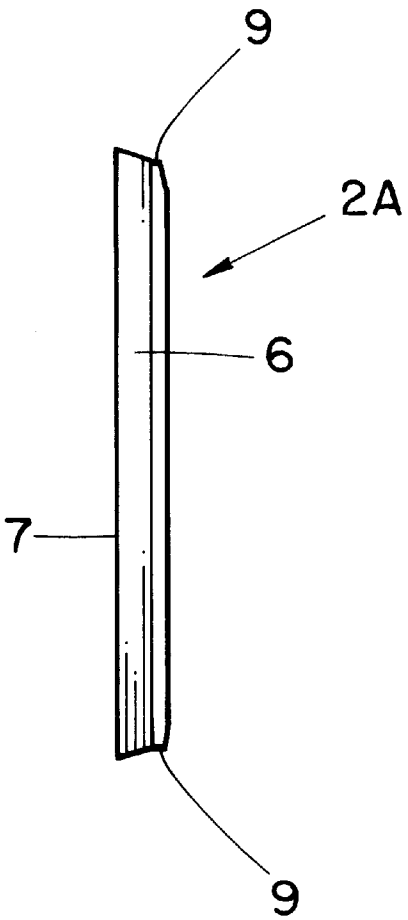
FIG. 4 is a side view of the panel of FIG. 3.
Figure 3:
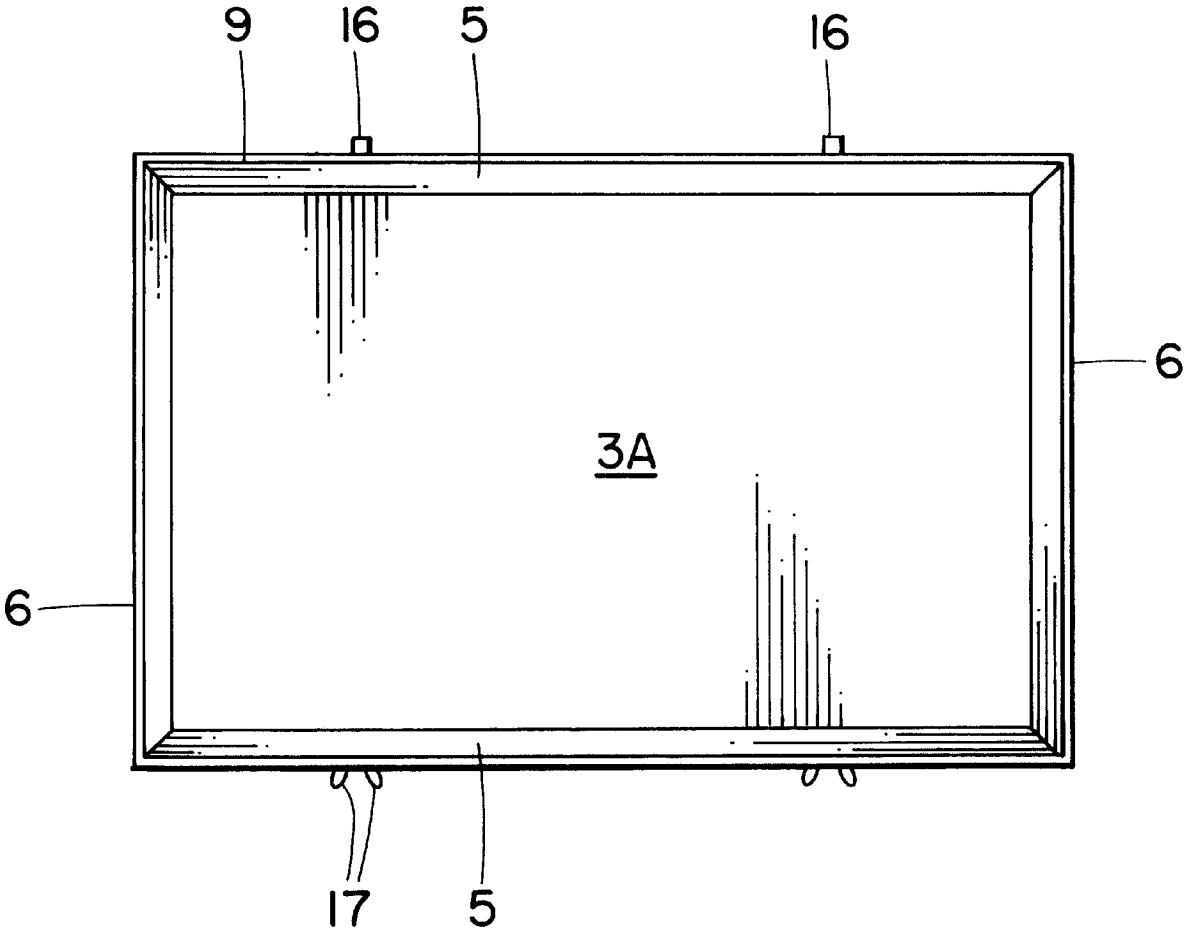
FIG. 3 is a front view of a beveled concrete panel.
Figure 5:
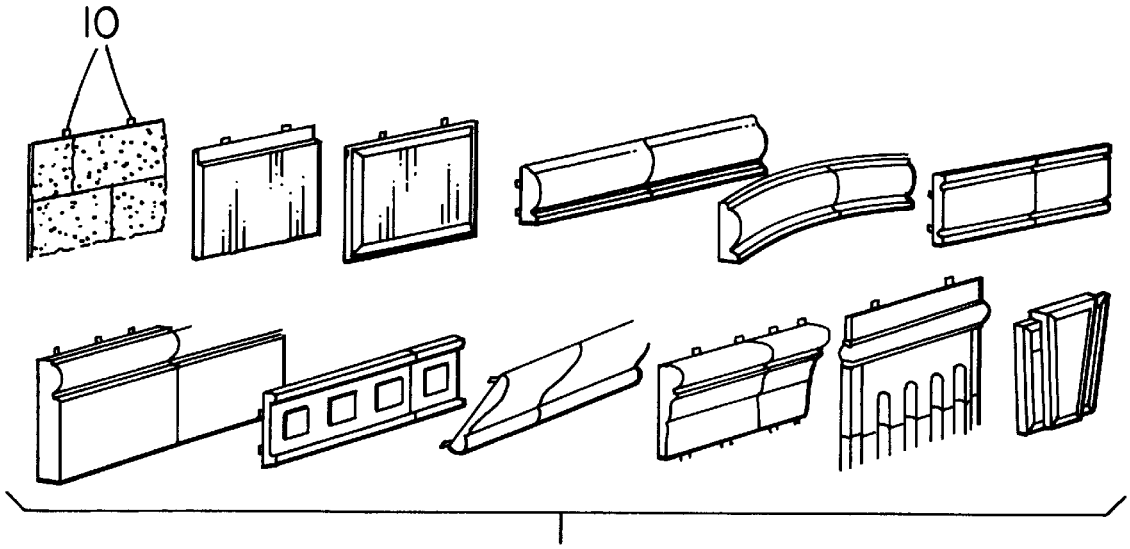
FIG. 5 is a view of a range of planar and contoured panels and moldings.
Figure 6:
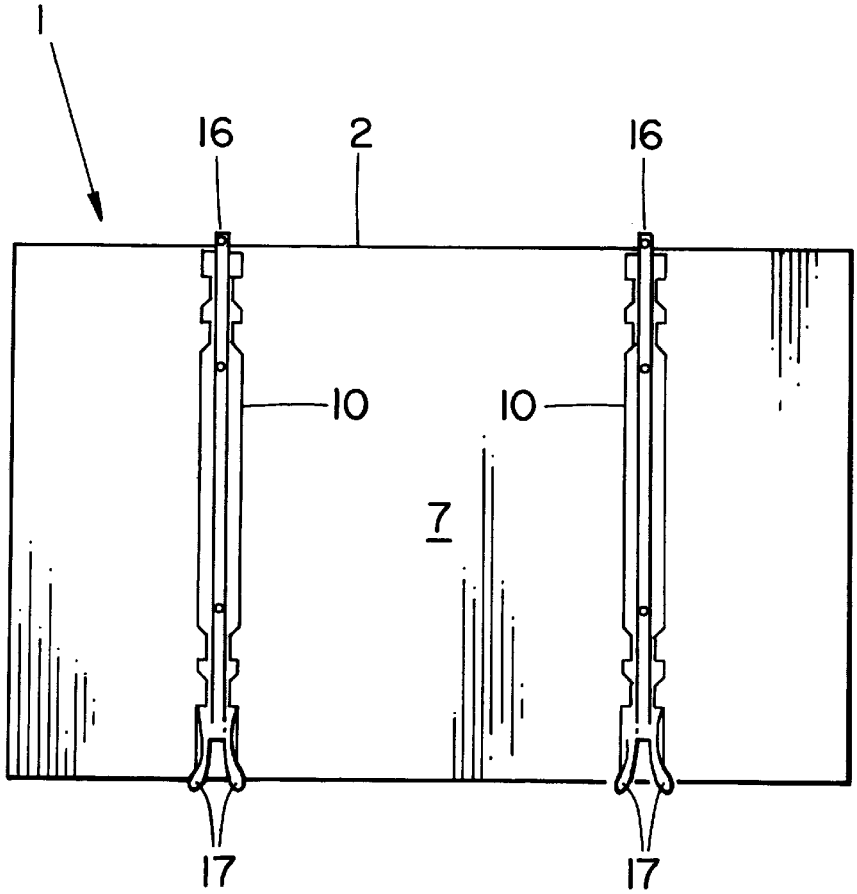
FIG. 6 is a rear view of the panels of FIGS. 1 and 3.

Referring to FIGS. 1 to 6, the method and apparatus of the present invention are designed to produce a concrete panel generally indicated at 1. The panel includes a thin rectangular body 2, typical dimensions of which are 12"×18"×⅝", however, irregular shapes as shown in FIG. 5 may also be formed. The body 2 has a textured, beveled or irregular outer or front surface 3, sloping, tapered sides 5 and 6 and a rough, planar inner or rear surface 7. A groove 9 or caulking ledge extends around the side periphery of the panel 1. FIGS. 3 and 4 show a similar panel 1A to that of FIGS. 1 and 2 but with smooth face 3A & 2A. A pair of hangers 10 are embedded in the rear surface 7 of the panel 1A. The hangers 10 (FIG. 6) are used to mount the panel 1 on plywood backing or other suitable backing shown in FIGS. 20 and 21 when finishing a wall. A flexible grout is provided between the panels to complete the exterior wall.

Figure 7:
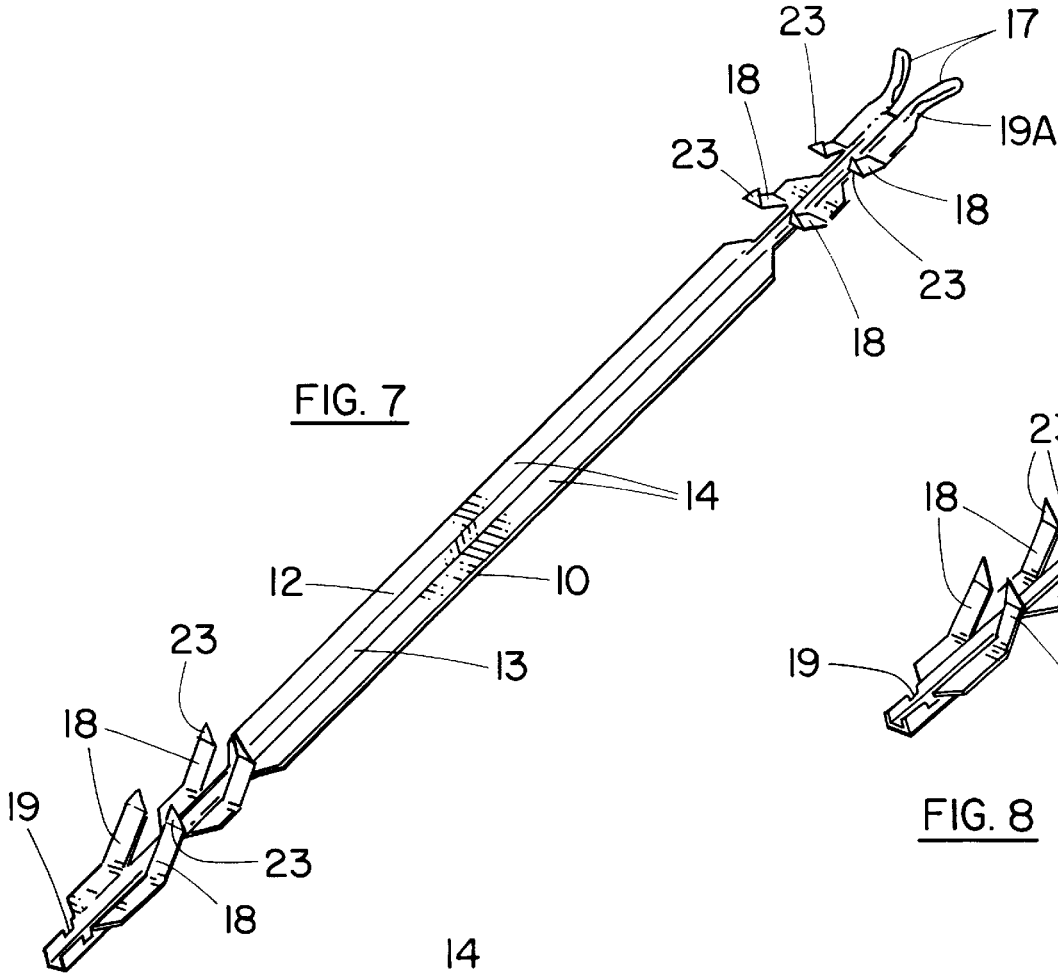
FIG. 7 is a perspective view of a hanger used in the panels of FIGS. 1 to 6.
Figure 8:
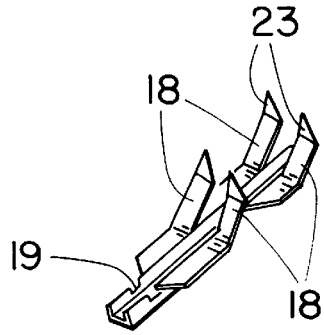
FIG. 8 is a perspective view of the top portion of the hanger of FIG. 7.
Figure 11:
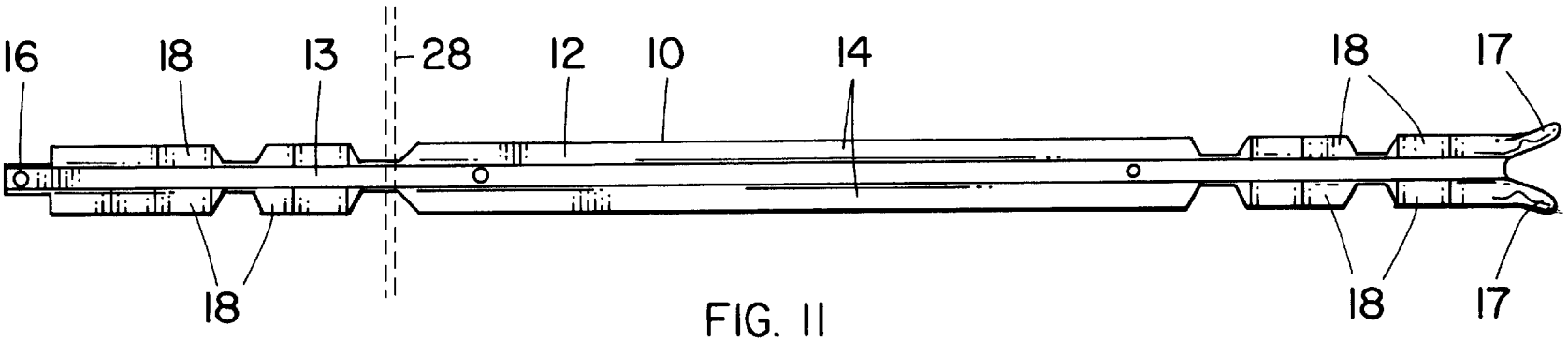
FIG. 11 is a bottom view of the hanger of FIG. 7.
Figure 12:
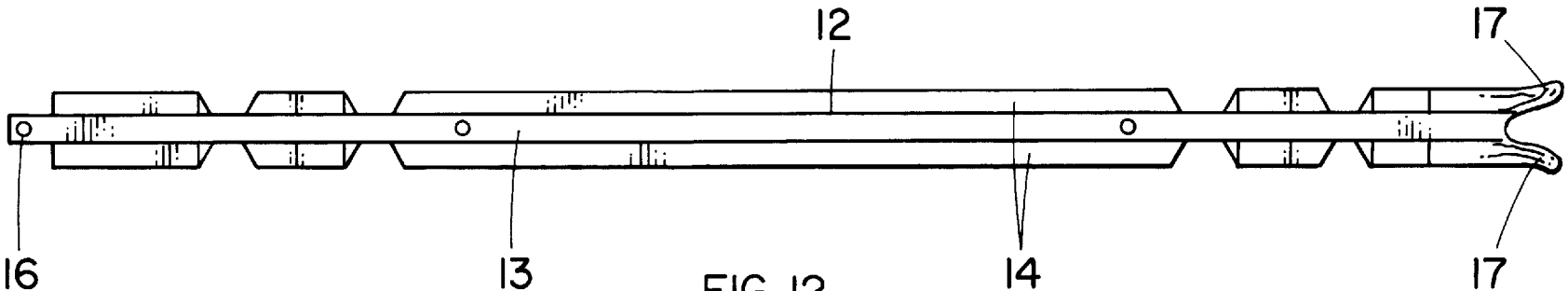
FIG. 12 is a top view of the hanger of FIG. 7.
Figure 14:
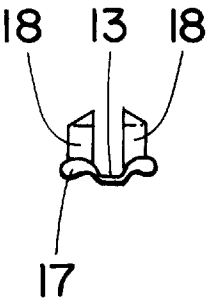
FIG. 14 is an end view of the hanger of FIGS. 7 and 11 as seen from the right of FIG. 11.
Figure 13:
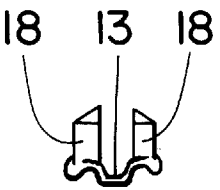
FIG. 13 is an end view of the hanger of FIGS. 7 and 11 as seen from the left of FIG. 11.

As shown in FIGS. 7 to 10, each hanger 10 includes an elongated, galvanized metal body 12 (or other suitable materials such as plastic) defining a central channel 13 with a generally U-shaped cross section extending outwardly from the edges of the channel 13. A locating hole 16 (FIGS. 11 and 12) is provided in one end of the body 12, and a pair of diverging spring arms 17 are provided on the other end of the body. The arms 17 are extensions of the flanges 14. Slits are cut in the flanges 14 near each end thereof, and the thus formed prongs 18 are bent at approximately 45 degrees to the flange 14 for anchoring the hanger 10 in the concrete body 2 of the panel 1. Prongs 18 also include sharp pointed tips 23 which are also bent at 24; this prevents surface spotting; also shown in FIG. 7 are bottom and top syphoning bridges 19 and 19A respectively, these aid in transfer of concrete around hangers 10 and more specifically prevent concrete from flowing into hanger positioning cavities 40 and 41.

Figure 9:
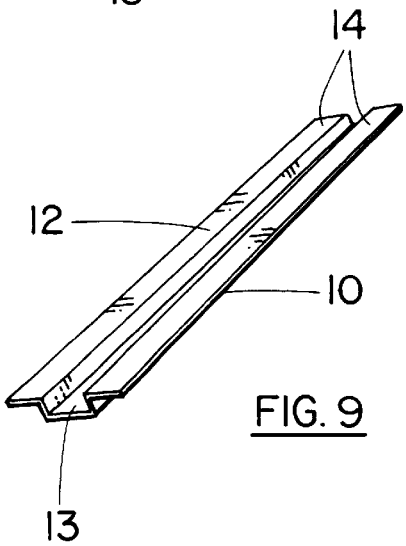
FIG. 9 is a perspective view of a stabilizing clip.
Figure 10:
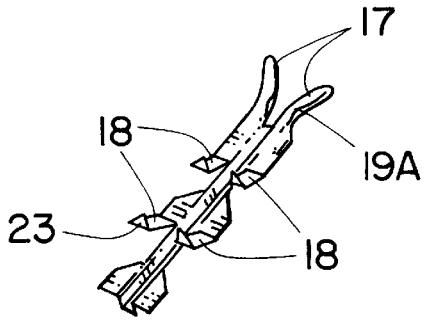
FIG. 10 is a perspective view of the bottom portion of hanger of FIG. 7.

Numerals 25 and 26 (FIGS. 8 and 10) indicate top and bottom hanger parts, which when separated from the main hanger body 12 permit use as separate hanger part portions. Numeral 28 (FIG. 11) indicates the cut, to sever top and bottom hanger parts, and numeral 29 indicates cut to sever stabilizing clip (FIG. 9).

Referring to FIGS. 15 to 19, and FIGS. 29 to 32, panels 1 are produced using a form 30 and an extruder 100 generally indicated at FIGS. 29 to 32, respectively. The form 30 shown in part section in FIG. 15(a) is defined by a thin, molded, polystyrene sheet 34, which includes a plurality of cavities 35 for receiving concrete. A flat ledge 34 (FIG. 15) is provided around the top periphery of each cavity 35. Pairs of hanger positioning cavities 40 and 41 are molded, these cavities 40 and 41 formed in the ledge 34 on opposite sides of each cavity are intended to support the ends of the hangers 10 during vibration.

Figure 22:
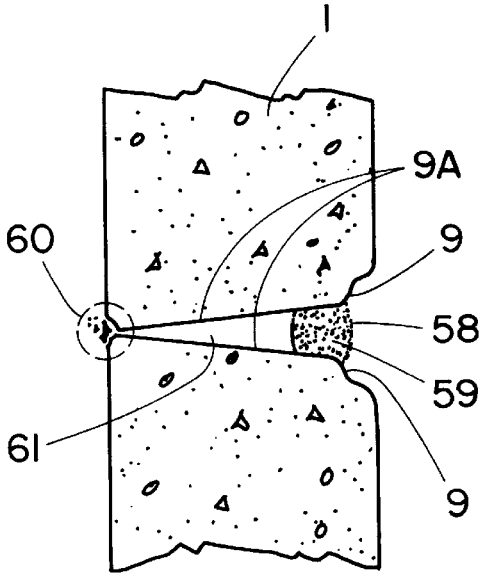
FIG. 22 is an enlarged cross-sectional view of two adjoining panels of FIG. 1 showing in detail the crush zone and the flexible grout in the V-joint and the caulking shoulders.

The finished panel 1 as shown in FIGS. 1–4, and more clearly in FIG. 22, has beveled or tapered edges 9(a) and a further groove or recess 9 which is referred to here as a caulking groove. The edges 9(a) are beveled so as to form an angle of between eighty-five and ninety degrees with the rear surface 7 of the panel. In FIG. 15(a) it will be seen that the mold as form 30 is configured to provide the tapered sides and the groove the latter being formed by the projection 37a.

Figure 15:
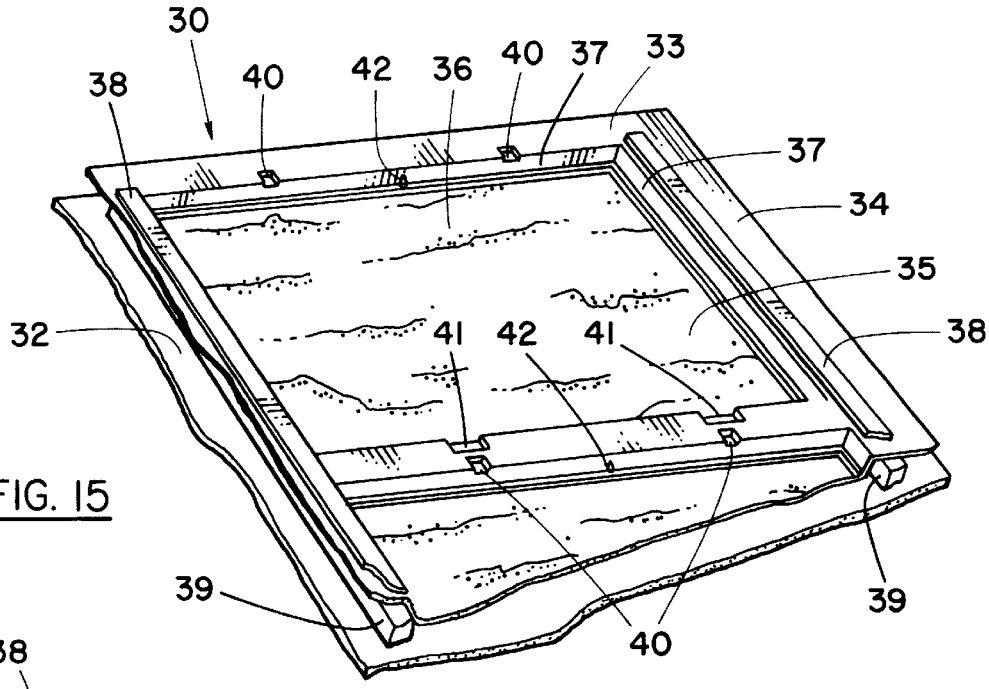
FIG. 15 is a perspective view of a section of the form and back-up panel and the hanger positioning cavities.
Figure 15A:
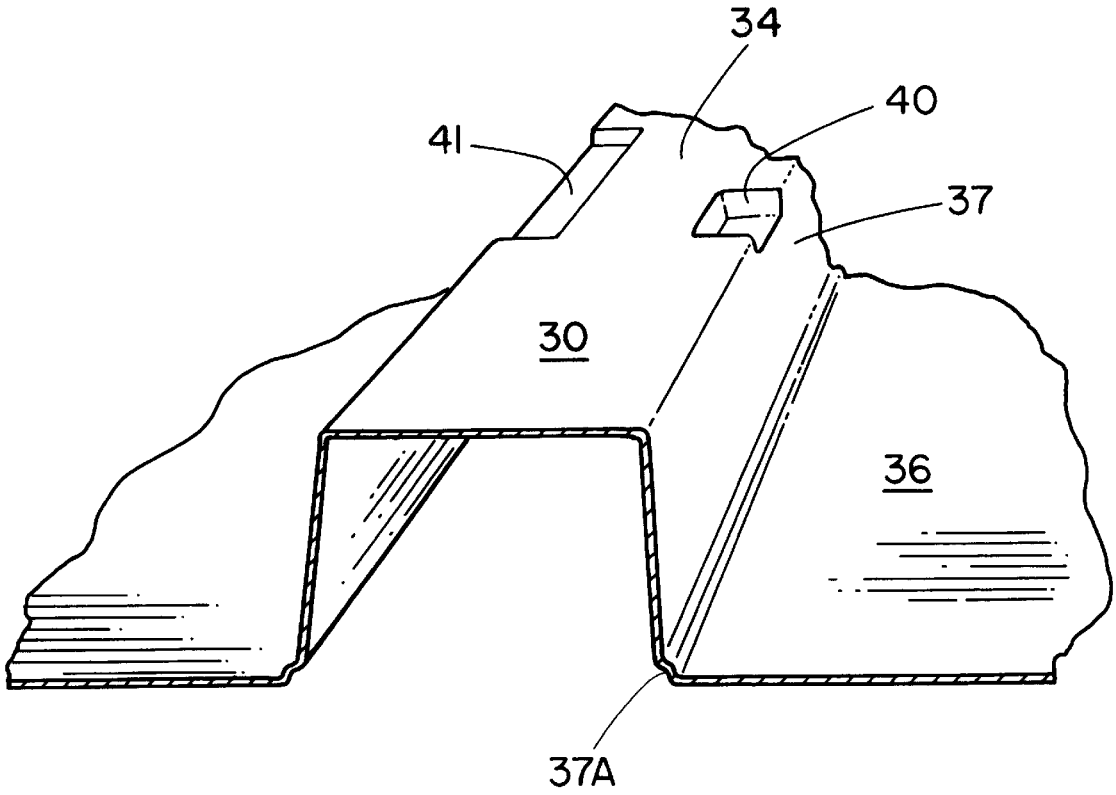
FIG. 15(a) is a partially sectional perspective view of the form referencing the formation of the caulking grooves.
Figure 23:
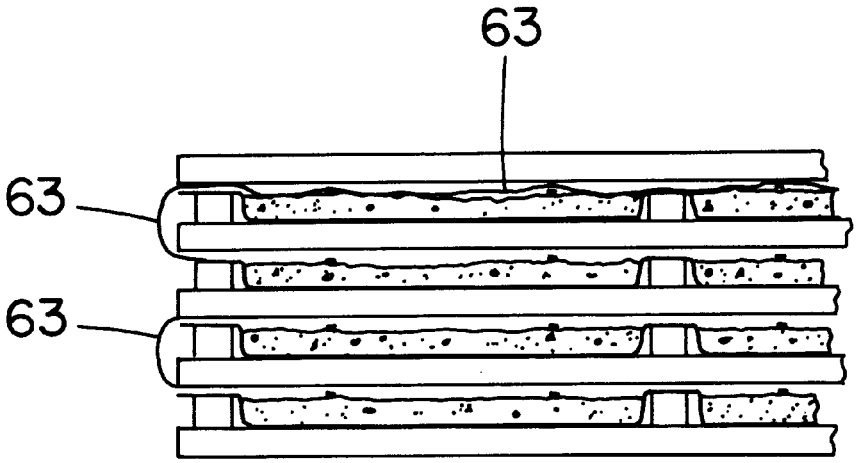
FIG. 23 is a cross section of filled forms as of FIG. 15 in a stacked formation.

As best shown in FIGS. 15 and 23, each form 30 includes releasing strips 38 and stacking strips 39.

Figure 19:
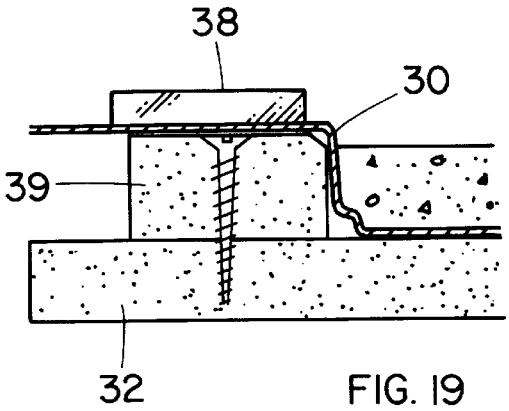
FIG. 19 is a cross section of the form of FIG. 15 with focus on stacking strips and the releasing strips.

As best shown in FIGS. 19 and 23, the vertical formation in stacking strips 39 are separated by the releasing strips 38 and form edges 34, thus causing the back-up panels 32 to become load bearing, and allow curing concrete panels to be stacked in this suspended position, the releasing strip 38 being bonded to form 30. The stacking strip 39 is bonded to the back-up panels 32.

The extruder 100 shown in FIGS. 29 to 32 is used to transfer concrete from a source thereof to the cavities 35 in the form 30.

In order to produce panels 1 of the type shown in FIGS. 1 to 6, concrete is poured into form 30 and hangers 10 are placed over each form cavity 35.

Figure 16:
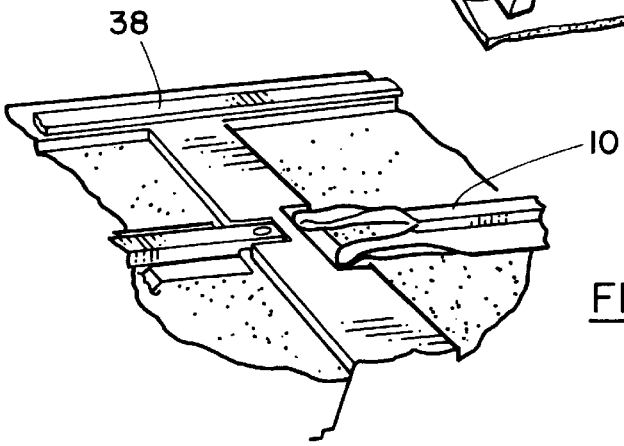
FIG. 16 is a perspective view of a form filled with concrete complete with hangers located in the hanger positioning cavities.

As best shown in FIG. 16, the hangers 10 rest in the hanger positioning cavities 40 and 41 and are aligned end to end to adjacent cavities. The form 30 with the hangers 10 hereon is placed on a vibrating table which includes motor 47, table frame 48, shown in FIG. 17, the top surface of which should be as clean as possible to avoid damage to the form by hard particles.

Figure 17:
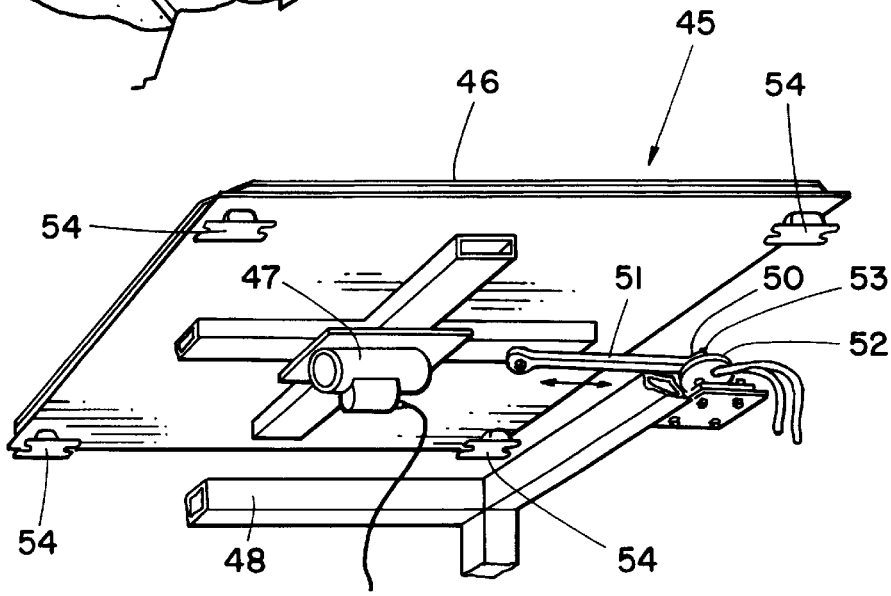
FIG. 17 is a perspective view of the vibrating table and the shock vibrator.

A center mark 42 (FIG. 15) is positioned in the form side wall 37. This center mark 42 becomes cast into each concrete panel making installation much easier. As best shown in FIG. 17 the form 30 is placed on top 46 of the vibrating table 45. The table is equipped with four rubber shock absorbers, or dampeners 54, a vibrator motor 47, and frame 48.

A shock vibrator 50 with hydraulic motor 52 is also mounted to the frame 48. Lateral vibrating shock action is produced by an eccentric wheel 53 and transferred to the vibrating table 45 through the shock vibrator connector arm 51. This lateral shock action of approximately 200 shocks per minute jars air bubbles free from the form cavity bottom 36 instantly and allows them to travel to the surface or the back of the panel 7. As part of this invention it was discovered that rotary vibrating action at high RPM's, e.g. 10000 RPM and the lateral shock action is extremely effective in a speedy air bubble elimination.

Figure 18:
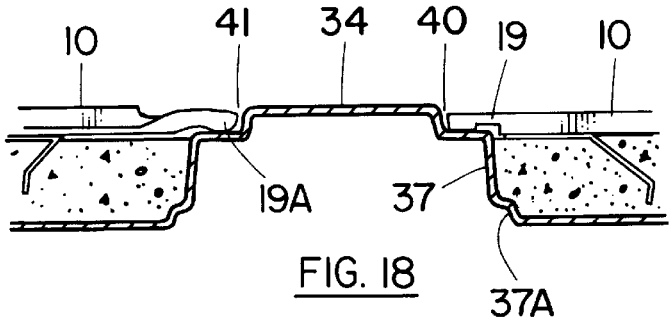
FIG. 18 is a cross section of a filled form of FIG. 15.

As best shown in FIG. 18, the syphoning bridges 19 and 19A aid in minimizing the undesirable effect of concrete liquids traveling along the hanger body 12 during vibration and settling in the hanger positioning cavities 40 and 41.

Figure 20:
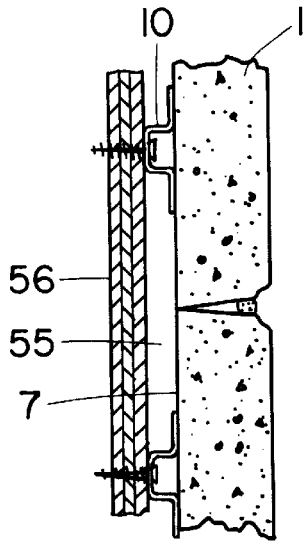
FIG. 20 is a top view cross section of two panels as of FIG. 1 installed on a wall.

As best shown in FIG. 20, when panels 1 are installed over the building substrate 56 a venting or draining gap 55 is formed by the space between the substrate 56 and the rear surface 7 of the panel 1, preventing water from accumulating behind the panels 1.

Figure 21:
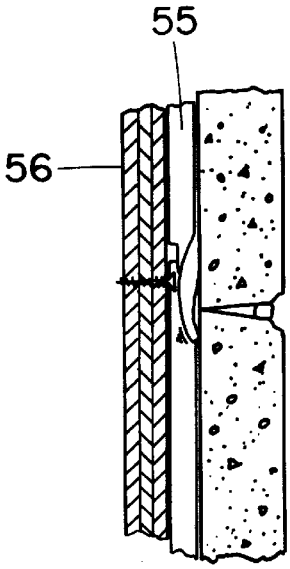
FIG. 21 is a side view cross section of two panels as of FIG. 1 installed on a wall, showing special focus on interlocking hangers of FIG. 7.

As best shown in FIG. 21, when installing the next row of panels 1 the arms 17 interlock behind the previously installed row of panels 1 and hold the panels 1 firmly to the building substrate. The spring action of arms 17 have the dual purpose of holding the bottom panel 1 firmly into place and also reducing the risk of over tension which would result in concrete breakout.

As best shown in FIG. 22 a crush zone 60 is formed at the rear of the panels 1 at the point of contact between two adjoining panels 1 installed on a house wall. This crush zone 60 absorbs thermal expansion pressures of installed panels 1 without harm to the individual panels 1 and without resulting in compounded expansion. Because of the bevel at the edge, the two adjacent panels 1 only contact at the rear edge corner, thus limiting the crush zone 60, and preventing cracking of the entire panel. The thermal expansion pressure exerted on the concrete panel 1 only occurs one time when the maximum temperature is reached for the area in which the panels 1 are installed. Thereafter, all thermal expansion is absorbed by the caulking material 59. This crush zone 60 eliminates the need for expansion joints which are required in prior systems. The crush zone 60 also prevents thermal cracks from developing around openings such as windows and doors. Even the presence of expansion joints in prior systems has not completely eliminated such cracks as does the present system with the crush zone 60 and flexible caulking 59.

As best shown in FIG. 22 a V-joint 61 results when two adjoining panels 1 are installed adjacent to each other. The apex of the V-joint 61 lies in the plane of the rear surface of the panels 1, and the beveled edges 9a extend from the rear of the panel toward the front where the caulking shoulder 9 is formed. Thus, the V-joint 61 opens from the rear of the panels toward the front, and the V-joint 61 enables maximum caulking adhesion and minimum caulking 59 usage as the caulking is applied into the joint. The caulking gun applicator coacts with the caulking shoulders 9 which guide the tip of the applicator to provide a contour which is most conducive to installing a good quality and speedy caulking joint. The caulking material 59 or sealant extends slightly into the V-joint 61 and in part of the caulking groove in order to ensure the maximum adhesion and minimum usage of sealant material 59. The concave caulking shoulders 9 also greatly assist in guiding the caulking gun tip (not shown), and result in caulking beads 59 that require no tooling except for minor tooling at V-joint 61 intersections. The V-joint 61 has an angle of eight degrees maximum, formed from the bevel on each side of the panels 1. An added benefit of this bevel is that the bevel facilitates removal of the panel from the mold.

Also shown in FIG. 22 is a silica sand coating 58 which is applied on the surface of the caulking bead, or flexible grout 59. This silica sand coating is applied with a mini spray hopper or brush (not shown), and the result is a flexible grout seam that is crack resistant and U.V. light resistant.

As best shown in FIG. 23, forms 30 can be stacked preferably to a minimum height of 5 feet. In practice, each form located at the bottom is capable of load bearing weight in excess of one ton. A thin watertight membrane 63 is collated between each form and thus serving a triple function of sealing the concrete and preventing thermal shrinkage cracks, preventing the back up panel from warping due to water absorption and protecting the underside of the back-up panel from scratches during the demolding process.

Figure 24:
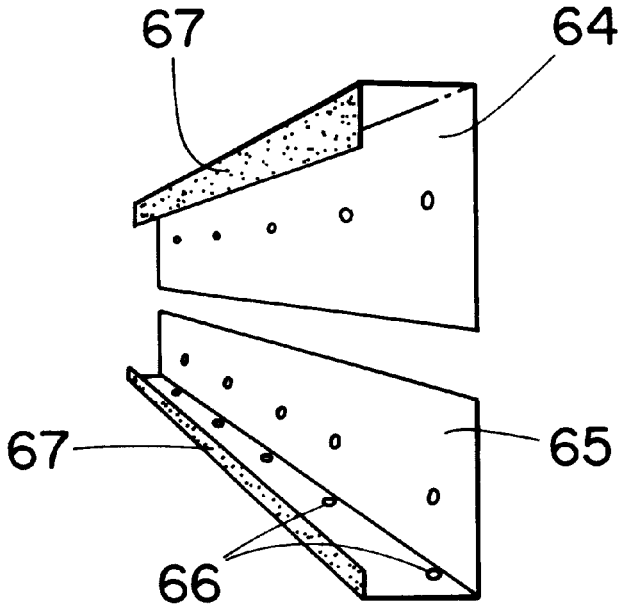
FIG. 24 is a perspective view of a top and bottom installation channels as part of the present invention.

As best shown in FIG. 24, a bottom 65 and a top 64 galvanized J-channel are utilized to assist installation of the panel 1 on a building. The face 67 of these J-channel are coated with silica sand to match other flexible grout seams 59. The bottom J-channel 65 features bottom perforations 66 allowing for air circulation behind the panels 1 and also water is allowed to drain from these holes. Panels 1 installed in the top channel 64 have adequate air spaces and no further perforations are required.

Figure 25:
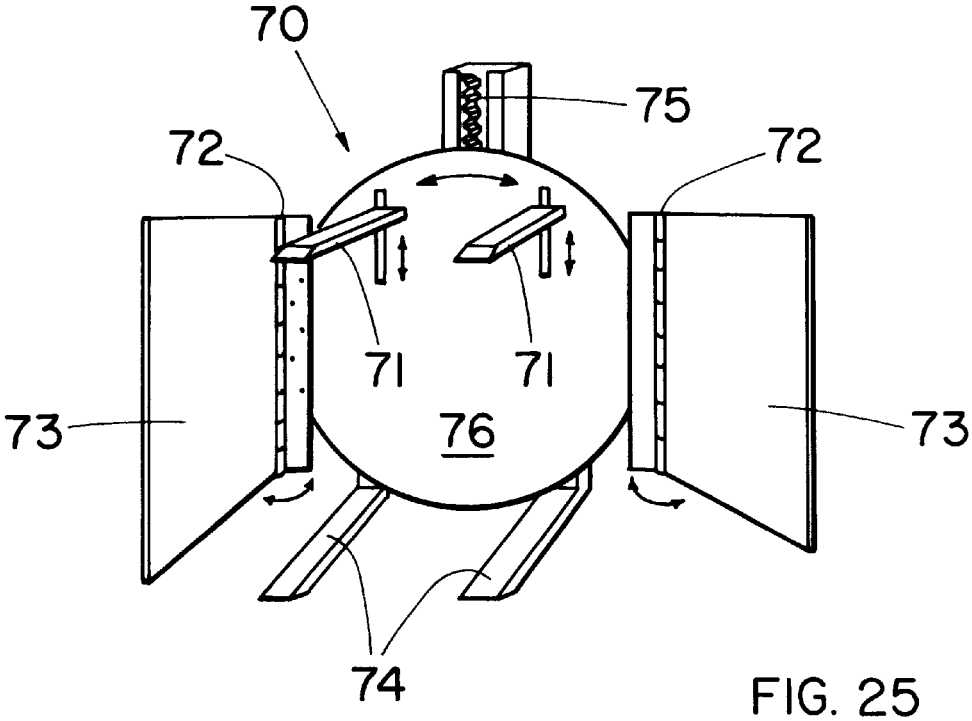
FIG. 25 is a perspective view of a stack rotating device used for multiple simultaneous demolding.
Figure 26:
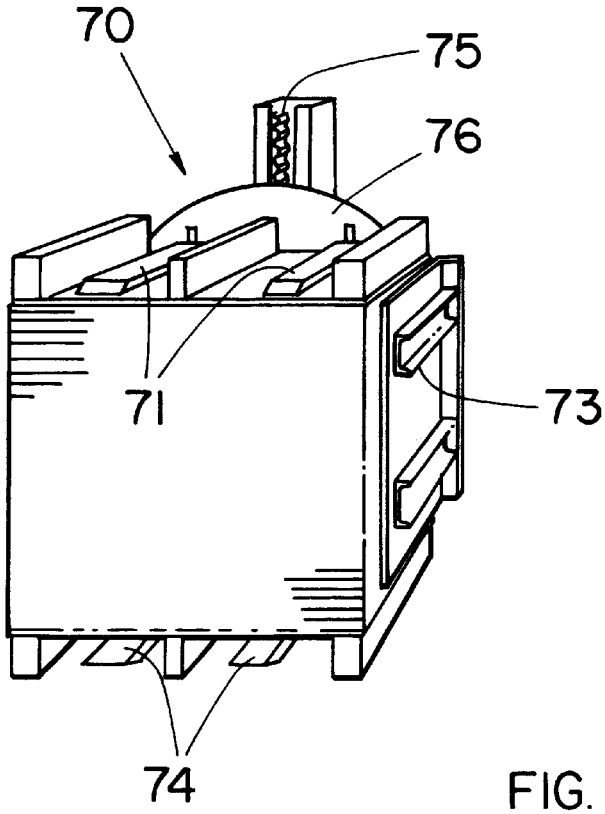
FIG. 26 shows a perspective view of the rotating demolder as of FIG. 25 in a loaded state as part of this invention.

As best shown in FIGS. 25 and 26, a multi-layered form demolder 70 is provided which receives a stacked 20 pallet of full forms 30 between upper movable forks 71 and lower fixed forks 74. The movable forks 71 are lowered and the locking side doors 73 hinged at 72 are firmly locked in place. The lifting mechanism 75 is activated to gain clearance for a 180 degree turn of the 25 rotating back plate 76. This action results in the simultaneous demolding of a multi-layer stack.

Figure 27:
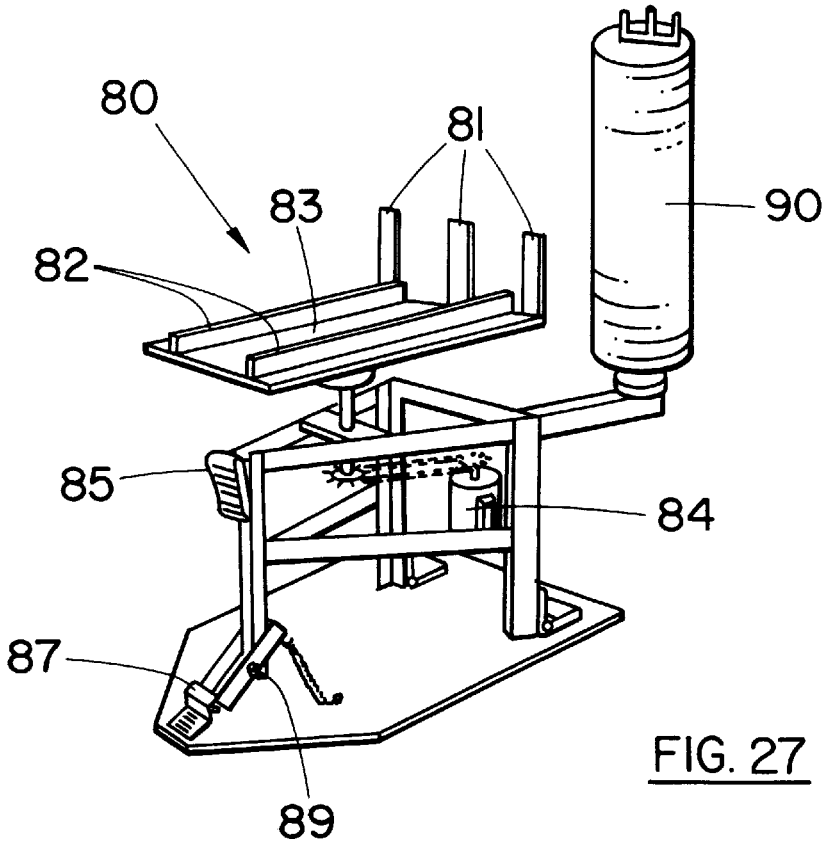
FIG. 27 shows a tilting bundle stretch wrapper as part of this invention. Shown tilted and ready for loading.
Figure 28:
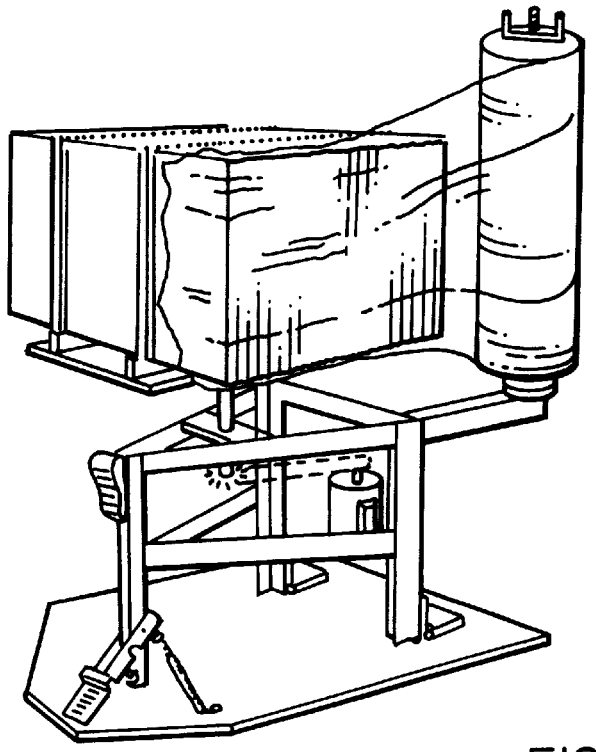
*FIG. 28 is a further view of the tilting bundle stretch wrapper shown in FIG. 27, loaded with a bundle of panels.*
Figure 29:
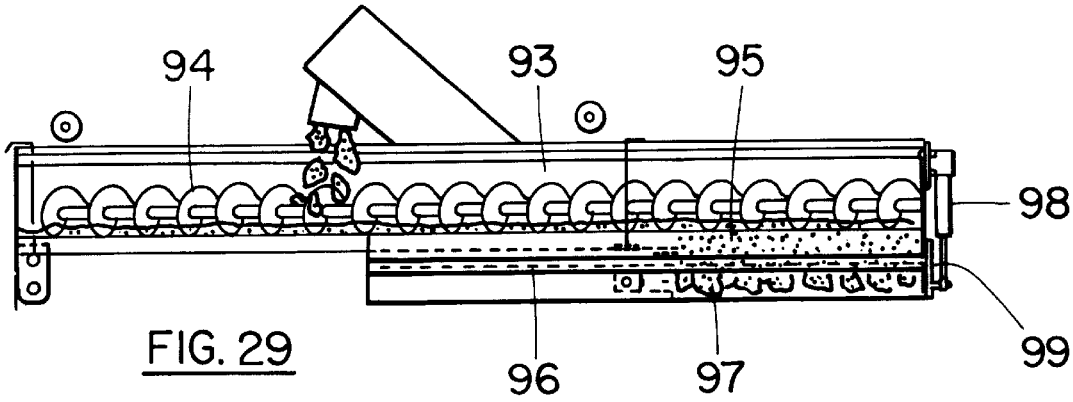
FIG. 29 shows long cross section of concrete extruder shown here while extrusion cavity is being filled.
Figure 30:
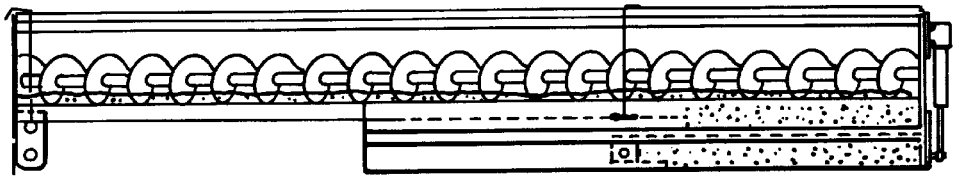
FIG. 30 shows extruder with closed doors and full extrusion cavity.

As best shown in FIGS. 27 and 28, a tiltable bundle shrink wrapper 80 is part of this invention. Unlike other building panels 1or tiles, the panels 1 have metal protruding at the top and bottom resulting in an unchallenged difficulty in transporting these panels 1. The device 80 is placed in its tilting position by activating foot pedal 87 which allows the device to tilt. A locking pin 89 aided by a spring 88 holds the device firmly when tilted.

Panels 1 are loaded against the retention forks 81 on the turntable 83. The stacking guides 82 aid in achieving an orderly bundle. The device is now placed in its level position by simply pulling it forward. The stretch wrap 90 is started as best shown in FIG. 28. The knee switch 85 activates the motor 84 and turns the turntable 83.

As best shown in FIGS. 29 to 32, concrete is filled from a continuous concrete source 92 into the extruder hopper 93.

The hopper slides on wheels 91 horizontally. Two augers 94 moves the concrete to the prefill cavity 95. The telescope door 96 is then opened and the concrete falls into the adjustable extruder cavity 97. The telescoping door is then closed again. The extruder cavity door 99 is actuated by an hydraulic cylinder 98.

Figure 31:
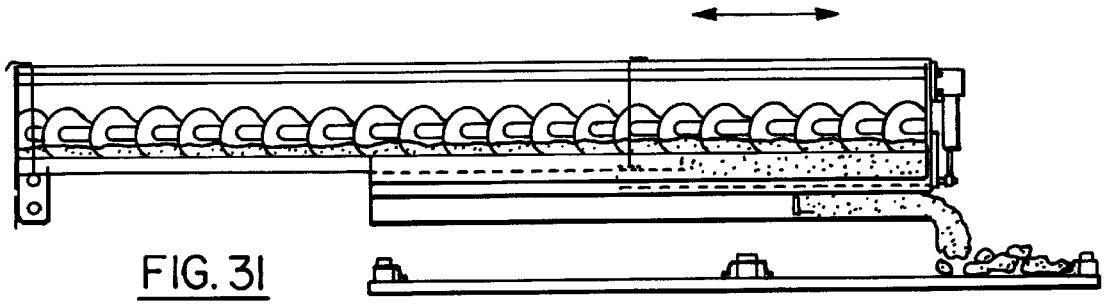
FIG. 31 shows extruder during form filling cycle.
Figure 32:
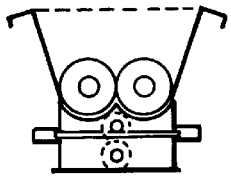
FIG. 32 shows short cross section of concrete extrude of FIG. 29.

Finally, FIG. 31 shows the extrusion of concrete from the cavity 97 into form cavities 35. Upon completion of the vibration and shock vibration step, the concrete is allowed to cure, completing a panel.

While this invention has been described as having certain preferred features and embodiments, it will be understood that it is capable of still further variation and modification with out departing from the spirit of the invention, and this application is intended to cover any and all variations and modifications of the invention as may be apparent from the foregoing description and claims, and as may be within the spirit of the invention and the scope of the appended claims.

I claim:

1. A concrete panel system comprising a plurality of concrete panels arranged in side-by-side fashion on a substantially vertical supporting wall, each of said panels comprising in turn;

a rectangular body having a front surface and a rear surface and beveled side edges, said side edges forming an angle of between eighty-five and ninety degrees with said rear surface;

a caulking groove connecting each of said beveled side edges with said front face, the side edges of adjacent panels forming a V-joint therebetween, and, a flexible sealant material in a portion of said caulking grooves of adjacent panels and a portion of said V-joint for providing a seal between adjacent panels, and wherein said V-joint widens from said rear surface toward said front surface and wherein the apex of said V-joint lies in the plane of said rear surface upon installation of said panels.

2. A concrete panel system as in claim 1 and wherein said panels include hanger means for securing said panels to said supporting wall.

3. A concrete panel system as in claim 2 and wherein said-hanger means includes a hanger embedded in said panels and projecting from said rear surface.

4. A concrete panel system as in claim 1 and including a coating on the exposed surface of said sealant material for protecting said sealant material from [LTV] *UV* light.

5. A concrete panel system as in claim 4 and wherein said coating comprises a silica sand.

6. A concrete panel system comprising a plurality of concrete panels arranged in side-by-side fashion on a substantially vertical supporting wall, each of said panels comprising in turn;

a rectangular body having a front surface and a rear surface and beveled side edges, said side edges forming an angle of between eighty-five and ninety degrees with said rear surface;

a caulking groove connecting each of said beveled side edges with said front face, the side edges of adjacent panels forming a V-joint therebetween, and, a flexible sealant material in a portion of said caulking grooves of adjacent panels and a portion of said V-joint for providing a seal between adjacent panels, and wherein said side edges of each panel are in contact with the side edges of each adjacent panel at a crush zone formed in the panel for absorbing thermal expansion of said panels after installation.

7. A concrete panel system as in claim 6 and wherein the apex of said V-joint lies in the plane of said rear surface upon installation of said panels.

8. A concrete panel system as in claim 7 and wherein said panels include hanger means embedded in said panels and projecting from said rear surface for securing said panels to said supporting wall.

9. A concrete panel system comprising a plurality of concrete panels arranged in side-by-side fashion on a substantially vertical supporting wall, each of said panels in turn comprising;

a rectangular body having a front surface and a rear surface and beveled side edges, said side edges forming an angle of between eighty-five and ninety degrees with said rear surface;

a caulking groove connecting each of said beveled side edges with said front face, the side edges of adjacent panels forming a V-joint between the adjacent panels;

a flexible sealant material in portions of said caulking grooves of adjacent panels and a portion of said V-joint for providing a seal between adjacent panels, and, hanger means embedded in said panels for securing said panels to said supporting wall and, a coating on the exposed surface of said sealant material for protecting said sealant material from UV light.

*10. A concrete panel system comprising a plurality of concrete panels arranged in side-by-side fashion on a substantially vertical supporting wall, each said panel having:*

*a rectangular panel body having a front surface and a rear surface and beveled side edges, such that the side edges of adjacent panels form a V-joint therebetween, said V-joint having its apex at the rear surfaces of the panels upon installation of the panels;*

*a caulking groove connecting each beveled side edge with said front surface; and*

*a flexible sealant material in portions of the caulking grooves of adjacent panels and said V-joints, for providing a seal between adjacent panels.*

*11. A concrete panel system as in claim 10 wherein each panel includes hanger means for securing the panel to the supporting wall.*

*12. A concrete panel system as in claim 11 wherein the hanger means comprises a hanger embedded in the panel and projecting from the rear surface thereof.*

*13. A concrete panel system as in claim 10, further including a coating on the exposed surface of the sealant material, for protecting the sealant material from ultraviolet light.*

*14. A concrete panel system as in claim 13 wherein the coating comprises a silica sand.*

*15. A concrete panel system as in claim 10 wherein the side edges of the panels are in contact with corresponding side edges of adjacent panels at crush zones formed in the panels at the apex of the V-joint, for absorbing thermal expansion of the panels after installation.*

*16. A concrete panel system comprising a plurality of concrete panels arranged in side-by-side fashion on a substantially vertical supporting wall, each said panel having:*

*a rectangular panel body having a front surface and a rear surface and beveled side edges, such that the side edges of adjacent panels form a V-joint therebetween, said V-joint having its apex at the rear surfaces of the panels upon installation of the panels;*

*a hanger embedded in the panel and projecting from the rear surface thereof, for securing the panel to the supporting wall;* a caulking groove connecting each beveled side edge with said front surface;

*a flexible sealant material in portions of the caulking grooves of adjacent panels and said V-joints, for providing a seal between adjacent panels; and*

*a coating on the exposed surface of the sealant material, for protecting the sealant material from ultraviolet light, said coating comprising a silica sand;*

*and wherein the side edges of the panels are in contact with corresponding side edges of adjacent panels at crush zones formed in the panels at the apex of the V-joint, for absorbing thermal expansion of the panels after installation.*

* * * * *